United States Patent
Uno

(10) Patent No.: US 8,179,703 B2
(45) Date of Patent: May 15, 2012

(54) POWER FACTOR CORRECTION CONVERTER

(75) Inventor: Yoshiyuki Uno, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/108,019

(22) Filed: May 16, 2011

(65) Prior Publication Data

US 2011/0211375 A1 Sep. 1, 2011

Related U.S. Application Data

(63) Continuation of application No. PCT/JP2009/059750, filed on May 28, 2009.

(30) Foreign Application Priority Data

Nov. 25, 2008 (JP) ................................ 2008-299060

(51) Int. Cl.
H02M 1/12 (2006.01)
G05F 1/40 (2006.01)
(52) U.S. Cl. ........................... 363/44; 323/284; 323/285
(58) Field of Classification Search .............. 363/44–47; 323/282–285, 290, 351
See application file for complete search history.

(56) References Cited

U.S. PATENT DOCUMENTS

| | | | |
|---|---|---|---|
| 6,175,218 B1 | 1/2001 | Choi et al. | |
| 6,753,798 B2 * | 6/2004 | Feldtkeller | 341/143 |
| 6,980,445 B2 * | 12/2005 | Fukumoto et al. | 363/45 |
| 7,538,525 B2 * | 5/2009 | Kim et al. | 323/205 |
| 7,772,811 B1 * | 8/2010 | Jain et al. | 323/224 |
| 2007/0103947 A1 | 5/2007 | Taguchi et al. | |
| 2008/0130336 A1 | 6/2008 | Taguchi | |

FOREIGN PATENT DOCUMENTS

| | | |
|---|---|---|
| JP | 07-087744 A | 3/1995 |
| JP | 2000-139079 A | 5/2000 |
| JP | 2003-348848 A | 12/2003 |
| JP | 2005-253284 A | 9/2005 |
| JP | 2007-129849 A | 5/2007 |

OTHER PUBLICATIONS

Official Communication issued in International Patent Application No. PCT/JP2009/059750, mailed on Aug. 25, 2009.

* cited by examiner

*Primary Examiner* — Jessica Han
(74) *Attorney, Agent, or Firm* — Keating & Bennett, LLP

(57) ABSTRACT

A power factor correction converter includes an output voltage error amplifier which functions as a proportioning device in a low-frequency range in order to stabilize the output voltage by feedback control and obtains a reference current amplitude value vm by multiplying an error ev between a desired output voltage value Vref and a detected output voltage value vo by a predetermined proportionality factor. A factor element multiplies the reference current amplitude value by a predetermined factor and adds the resulting value to a reference value to obtain a desired output voltage value. The factor element functions as a low-pass filter by changing the desired output voltage value Vref in accordance with the reference current amplitude value vm in a low-frequency range and reducing the factor value in a high-frequency range.

2 Claims, 5 Drawing Sheets

POWER FACTOR CORRECTION CONVERTER

BACKGROUND OF THE INVENTION

1. Field of the Invention

The present invention relates to an AC-DC converter that receives an alternating-current power supply and outputs a direct-current voltage and, in particular, to a PFC (power factor correction) converter that suppresses harmonic current.

2. Description of the Related Art

Electric apparatuses connected to a commercial power supply are subjected to harmonic current restriction corresponding to their power capacity. Switching power supply devices that receive a commercial power supply typically include a PFC converter in order to satisfy such a restriction.

A general switching power supply device using a commercial alternating-current power supply as an input power supply rectifies and smoothes the commercial alternating-current power supply to convert it into a direct-current voltage and then switches the direct-current voltage in a DC-DC converter. Thus, the input current is discontinuous and significantly deviates from a sine wave. This results in harmonic current.

For this reason, a PFC converter is disposed between a full-wave rectifier circuit and a smoothing circuit including a smoothing capacitor in order to suppress the harmonic current.

This PFC converter includes a chopping circuit and operates so that the input current waveform has a sinusoidal shape similar to and in phase with the input voltage waveform. Thus, harmonic current is suppressed to a certain level or below, and the power factor is improved.

Generally known control theories include P (proportional) control, PI (proportional-integral) control, and PID (proportional-integral-differential) control. PFC converters generally use P control, since responsiveness is more important than the steady-state characteristics of the output voltage.

Examples of PFC converters that perform P control include Japanese Unexamined Patent Application Publication No. 07-87744. FIG. 1 is a circuit diagram of a PFC converter described in Japanese Unexamined Patent Application Publication No. 07-87744. Referring to FIG. 1, the PFC converter of Japanese Unexamined Patent Application Publication No. 07-87744 will be described.

In FIG. 1, a step-up voltage converter is provided. This converter obtains a voltage vr by rectifying an alternating-current voltage va of a commercial power supply using a rectifier circuit 1, provides the voltage vr to a reactor 2, interrupts current passing through the reactor 2 using a switching transistor 3, and extracts a voltage generated at the reactor 2 during the current interruption via a diode 4 as an output voltage vo, as well as smoothes and stabilizes the extracted voltage using a capacitor 5.

A value vo detected by a voltage divider 6, of the output voltage vo is provided to an error amplification circuit 7, and an error voltage ve indicating the difference between the detected value vo and a set value vs therefor is output. A multiplication circuit 8 receives the error voltage ve and the rectified voltage vr, multiplies both voltages, and outputs a voltage error signal Se, which is proportional to the error voltage ve and has the same pulsing waveform as that of the rectified voltage vr.

Current passing during the on-time of the switching transistor 3 and the waveform thereof are detected by a detection resistor 9, and this current waveform signal, Sc, and the above-mentioned voltage error signal Se are provided to a current error detection circuit 10 so that a current error signal S1 representing the waveform difference between both signals is output to the non-inverted input of a comparator 20. The comparator 20 compares the current error signal S1 with a sawtooth-shaped wave period signal so, which is received from a high-frequency oscillation circuit 21 and specifies the period during which the switching transistor 3 interrupts the current, and outputs an on/off instruction signal Sw, which is a PWM signal, to the switching transistor 3. Thus, the current passing through the reactor 2 is interrupted at a duty ratio specified by this on/off instruction Sw.

The PFC converter described in Japanese Unexamined Patent Application Publication No. 07-87744 obtains a high but finite gain in a low-frequency range. That is, even in a stable state, an error is present. As the output voltage error ve shown in FIG. 1 increases, the difference between the output voltage vo and the desired voltage vs increases, thereby reducing the output voltage.

In the PFC converter described in Japanese Unexamined Patent Application Publication No. 2007-129849, the gain is infinite in a direct current, such that the error can be eliminated in a stable state. However, in a transient state, such as an abrupt change in load, it takes time to charge or discharge the capacitor, such that the time taken until the output voltage settles is greater than that in the P-control PFC converter described in FIG. 1.

SUMMARY OF THE INVENTION

To overcome the problems described above, preferred embodiments of the present invention provide a PFC converter that provides both the responsiveness of P control and the stability of PI control and that prevents a variation in output voltage due to a variation in input voltage or load while preventing deterioration of transient responsiveness.

A PFC converter according to a preferred embodiment of the present invention preferably includes a rectifier circuit arranged to rectify an alternating-current voltage received from an alternating-current input power supply, a series circuit connected to a trailing portion of the rectifier circuit and including an inductor and a switching element, a rectifying and smoothing circuit connected in parallel with the switching element, a switching control circuit arranged to on/off control the switching element so that input current received from the alternating-current input power supply has a shape similar to the shape of the alternating-current voltage, an input voltage detection circuit arranged to detect an input voltage received from the alternating-current input power supply, an inductor current detection circuit arranged to detect current passing through the inductor, and an output voltage detection circuit arranged to detect an output voltage of the rectifying and smoothing circuit, wherein the switching control circuit defines, as a reference current amplitude value, the product of an output voltage error, the output voltage error being the error between a desired output voltage value and a detected value of the output voltage, and a detected value of the input voltage and controls the on-time of the switching element in accordance with the difference between the reference current amplitude value and current passing through the inductor, and the switching control circuit includes an output voltage control value correction circuit arranged to correct one of the desired output voltage value and the output voltage error using a value proportional to the reference current amplitude value.

In the PFC converter according to a preferred embodiment of the present invention, the switching control circuit and the output voltage control value correction circuit preferably include a digital signal processor arranged to hold a digital value corresponding to the desired output voltage value and the output voltage control value correction circuit is preferably arranged to correct the digital value using the value proportional to the reference current amplitude value.

According to various preferred embodiments of the present invention, a variation in output voltage due to a variation in input value or load is effectively prevented while deterioration of transient responsiveness is also effectively prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A PFC converter according to a first preferred embodiment of the present invention will be described with reference to FIG. 2 to 6.

Figure 1:
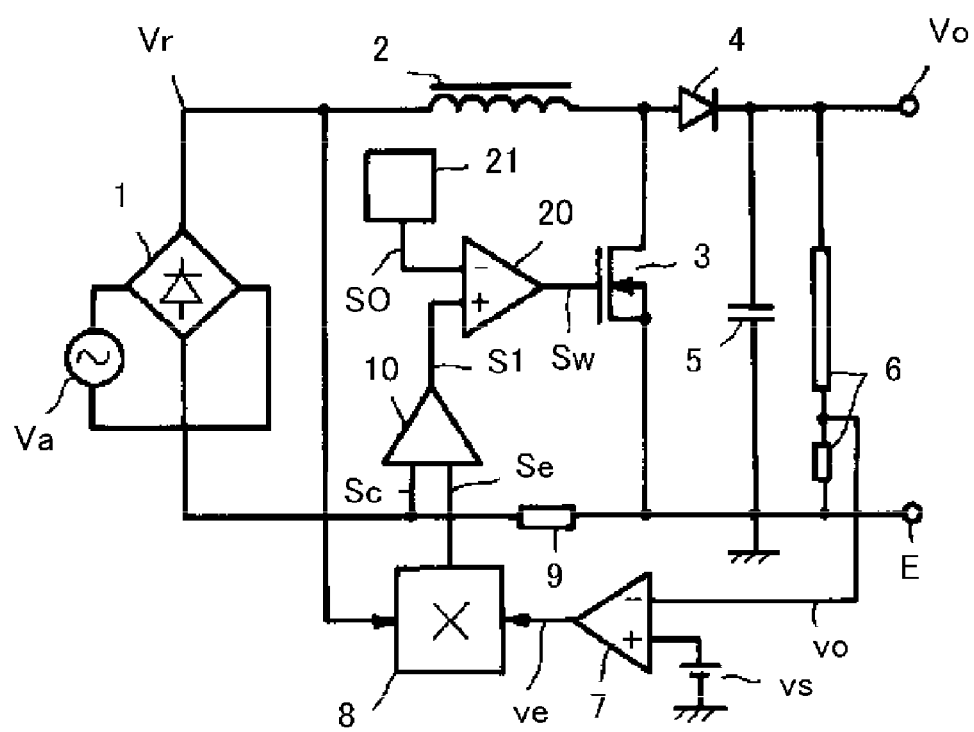
FIG. 1 is a circuit diagram of a known PFC converter.
Figure 2:
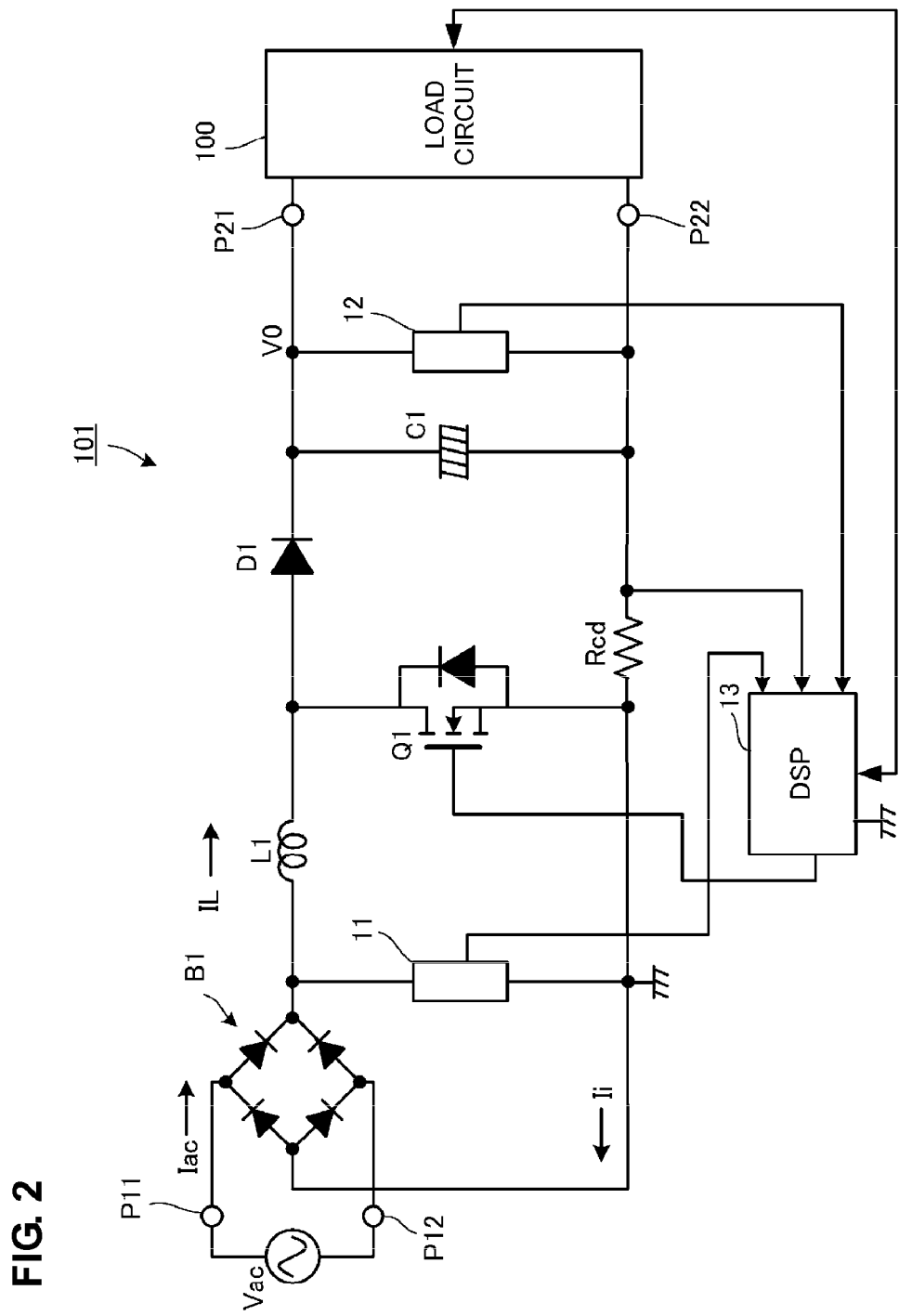
FIG. 2 is a circuit diagram of a PFC converter according to a first preferred embodiment of the present invention.

FIG. 2 is a circuit diagram of the PFC converter according to the first preferred embodiment. In FIG. 2, numerals P11 and P12 are the input ports of a PFC converter 101, and numerals P21 and P22 are the output ports of the PFC converter 101. An alternating-current input power supply vac, which is a commercial alternating-current power supply, is input into the input port P11 and P12, and a load circuit 100 is connected to the output ports P21 and P22.

The load circuit 100 is preferably, for example, a circuit including a DC-DC converter and an electronic device that receives power supply therefrom.

A diode bridge B1, which full-wave rectifies the alternating-current voltage of the alternating-current input power supply vac, is disposed in the input stage of the PFC converter 101. The diode bridge B1 corresponds to a "rectifier circuit" in preferred embodiments of the present invention. A series circuit preferably including an inductor L1, a switching element Q1, and a current detection resistor Rcd, is connected to an output of the diode bridge B1. A rectifying and smoothing circuit preferably including a diode D1 and a smoothing capacitor C1 is connected in parallel with both end portions of the switching element Q1. The inductor L1, the switching element Q1, the diode D1, and the smoothing capacitor C1 define a step-up chopper circuit. The current detection resistor Rcd and an input portion of a digital signal processing circuit 13, which receives signals from the current detection resistor Rcd, correspond to "an inductor current detection circuit" in preferred embodiments of the present invention.

An input voltage detection circuit 11 is disposed between both output terminals of the diode bridge B1. An output voltage detection circuit 12 is disposed between the output ports P21 and P22. The digital signal processing circuit 13 preferably includes a DSP and controls the PFC converter 101 by digital signal processing. Specifically, the digital signal processing circuit 13 receives an output signal of the input voltage detection circuit 11 so as to detect the voltage phase of the alternating-current input power supply. The digital signal processing circuit 13 also receives an output signal of the output voltage detection circuit 12 so as to detect the output voltage. The digital signal processing circuit 13 also turns on or off the switching element Q1 at a predetermined switching frequency.

The digital signal processing circuit 13 corresponds to "a switching control circuit" in preferred embodiments of the present invention. The input voltage detection circuit 11 and an input portion of the digital signal processing circuit 13, which receives signals from the input detection circuit 11, correspond to "an input voltage detection circuit" in preferred embodiments of the present invention. The output voltage detection circuit 12 and an input portion of the digital signal processing circuit 13, which receives signals from the output voltage detection circuit 12, correspond to "an output voltage detection circuit" in preferred embodiments of the present invention.

The digital signal processing circuit 13 also preferably includes ports through which it communicates with the load circuit 100, and, for example, communicates data or receives or outputs signals, always transmits the converter state to the load circuit (electronic device), transmits the input voltage, the output voltage, the output current thereto, and receives the load state therefrom to incorporate it into switching control.

Figure 3A:
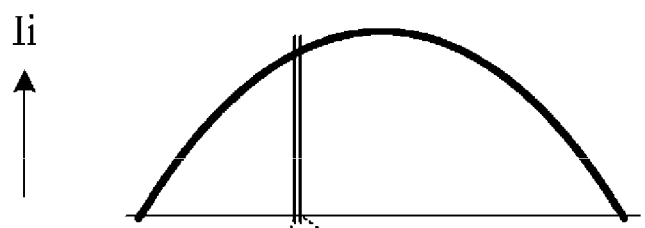
FIGS. 3A to 3C show waveform diagrams of the voltage or current of a PFC converter in a switching period in a state in which control is being performed in a continuous current mode.
Figure 3B:
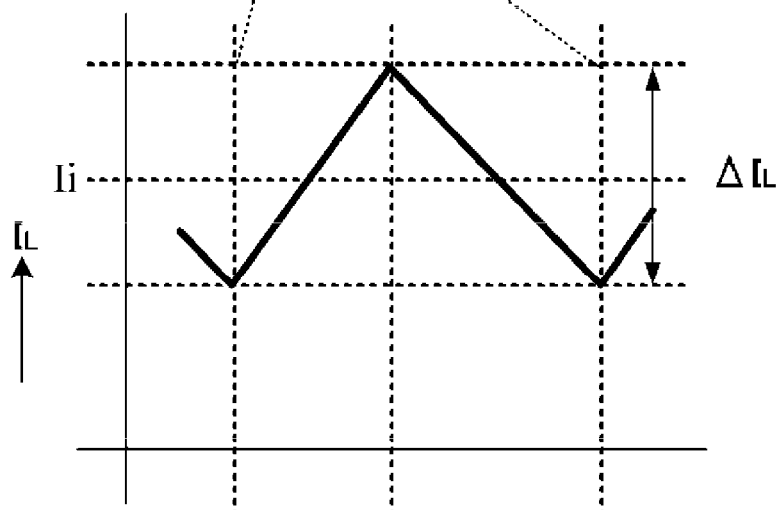
Figure 3C:
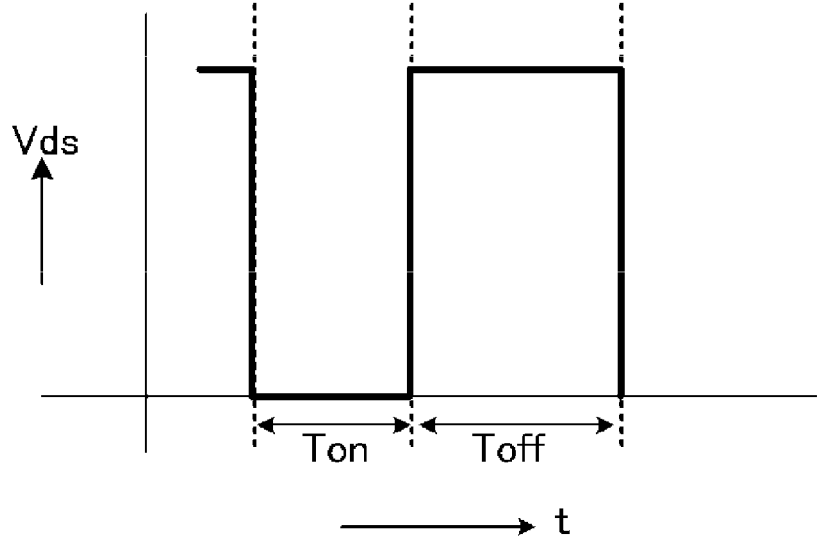

FIGS. 3A to 3C are waveform diagrams of the voltage or current of the PFC converter 101 in a switching period in a state in which control is being performed in continuous current mode. The digital signal processing circuit 13 performs switching control so that the average value of current input into the PFC converter 101, that is, the average value of current passing through the inductor L1 has a shape similar to the full-wave rectified waveform. The passage of the input current having a shape similar to that of the input voltage in this manner effectively prevents harmonics and improves the power factor.

FIG. 3A is a current waveform of the average value Ii of the current passing through the inductor L1 in a semi-period of the commercial power supply frequency; FIG. 3B is a waveform diagram of the current IL passing through the inductor L1 in a switching period where a portion of the time axis is expanded; and FIG. 3C is a waveform diagram of a drain-source voltage vds of the switching element Q1.

During the on-period Ton of the switching element Q1, the current IL passes through the inductor L1 and rises at an inclination determined by the voltage between both end portions of the inductor L1 and the inductance of the inductor L1. Subsequently, during the off-period Toff of the switching element Q1, the current IL falls at an inclination determined by the voltage between both end portions of the inductor L1 and the inductance of the inductor L1. As shown in FIG. 3B, the current IL passing through the inductor L1 varies in the switching period by the width of current ripple ΔIL.

Figure 4:
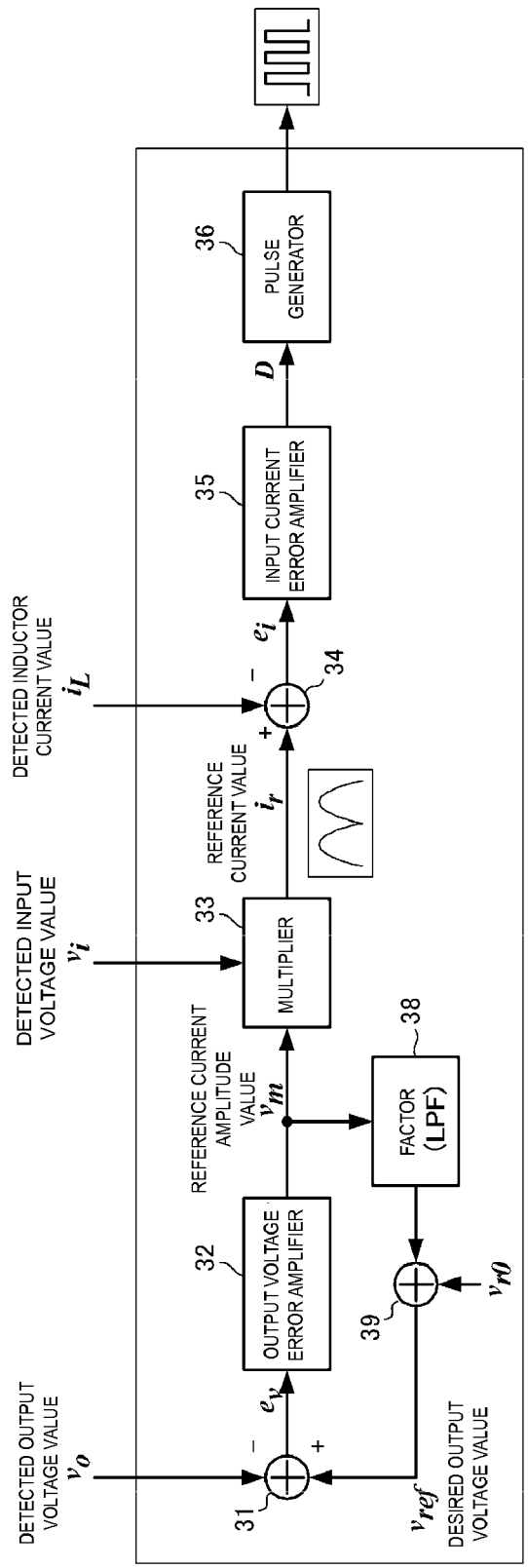
FIG. 4 is a block diagram showing the processes performed by a digital signal processing circuit shown in FIG. 2.

FIG. 4 is a block diagram showing the processes performed by the digital signal processing circuit 13 shown in FIG. 2.

In FIG. 4, an addition element 31 obtains an error ev between a desired output voltage value Vref which will be discussed later and a detected output voltage value vo. An output voltage error amplifier 32 obtains a reference current amplitude value vm by multiplying the error ev by a predetermined proportionality factor (generally, an error amplifier in a PFC converter has a high-range interruption characteristic, since the output voltage needs to be prevented from responding to the ripple of the input voltage). A multiplier 33 obtains a reference current value ir by multiplying the reference current amplitude value vm by a detected input voltage value vi. An addition element 34 obtains an input current error value ei, which is the difference between the reference current value ir and a detected inductor current value iL. An input current error amplifier 35 generates a modulation signal D to be provided to a pulse generator by multiplying the input current error value ei by a predetermined proportionality factor. A pulse generator 36 outputs a pulse signal that is a binary logic signal, based on the modulation signal D. This pulse signal is a switching control signal to be provided to the switching element Q1. That is, the pulse generator 36 PWM modulates the switching control signal using a value proportional to the input current error value ei. Thus, the on-time of the switching element Q1 is controlled.

A factor element 38 generates a value by multiplying the reference current amplitude value vm by a predetermined factor. An addition element 39 obtains the desired output voltage value Vref by adding the value generated by the factor element 38 to a reference value vr0. The factor element 38 and the addition element 39 correspond to "an output voltage control value correction circuit" in preferred embodiments of the present invention.

The factor element 38 changes the desired output voltage value Vref in accordance with an output vm of the output voltage error amplifier 32. For this reason, abnormal oscillation may occur depending on the condition. In such a case, a high-range interruption characteristic is provided to the factor element 38. Thus, even when the reference current amplitude value vm abruptly varies, the Vref varies slowly, which prevents a transient response.

Figure 5A:
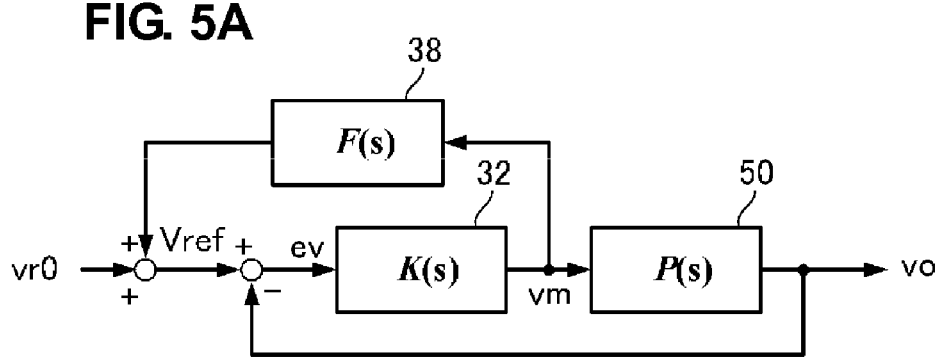
FIGS. 5A and 5B show block diagrams about feedback control of the output voltage.
Figure 5B:
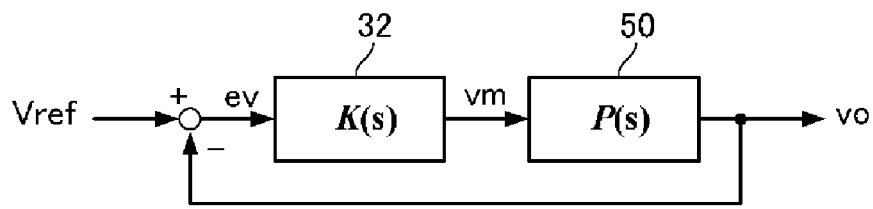

FIGS. 5A and 5B are block diagrams about feedback control of the output voltage. FIG. 5A is a block diagram of a feedback system preferably including the addition element 31, the output voltage error amplifier 32, the factor element 38, and the addition element 39 shown in FIG. 4. FIG. 5B is a comparative example and is a block diagram in which the factor element 38 or addition element 39 shown in FIG. 4 is not provided.

In a feedback system according to the comparative example shown in FIG. 5B, the error ev is obtained between the detected output voltage value vo and the desired output voltage value Vref, the output voltage error amplifier 32 outputs the reference current amplitude value vm, and a controlling object (PFC converter) 50 controls the output voltage (detected output voltage value vo) based on the reference current amplitude value vm.

On the other hand, in the feedback system shown in FIG. 5A, additionally, the factor element 38 preferably adds to the reference (fixed) desired value vr0 a value obtained by multiplying the reference current amplitude value vm by a factor so as to correct the desired output voltage value Vref.

Changing the desired value vr0 in accordance with the reference current amplitude value vm enables performing control so that the difference (the difference between the detected output voltage value vo and the desired output voltage value vre in a steady state) does not occur while substantially performing P control.

As described above, since the digital signal processing circuit 13 is preferably defined by a DSP, the influence of signal deterioration, noise intrusion, or element variations is eliminated, which enables highly accurate correction of the desired value. Further, conditional determination or conditional branching can be performed in a precise and complicated manner. For example, when the load is relatively large, the desired value is also relatively large, and, in this state, if it is detected that the load has abruptly decreased, the desired output voltage value Vref is reset to the initial value. Thus, a jump in output voltage when the load abruptly decreases is prevented.

Second Preferred Embodiment

In the first preferred embodiment, as shown in FIGS. 2 and 4, switching control is preferably performed using the digital signal processing circuit 13 defined by DSP. On the other hand, a second preferred embodiment of the present invention is an example in which the output voltage error amplifier 32 shown in FIG. 4 is preferably defined by an analog element.

Figure 6:
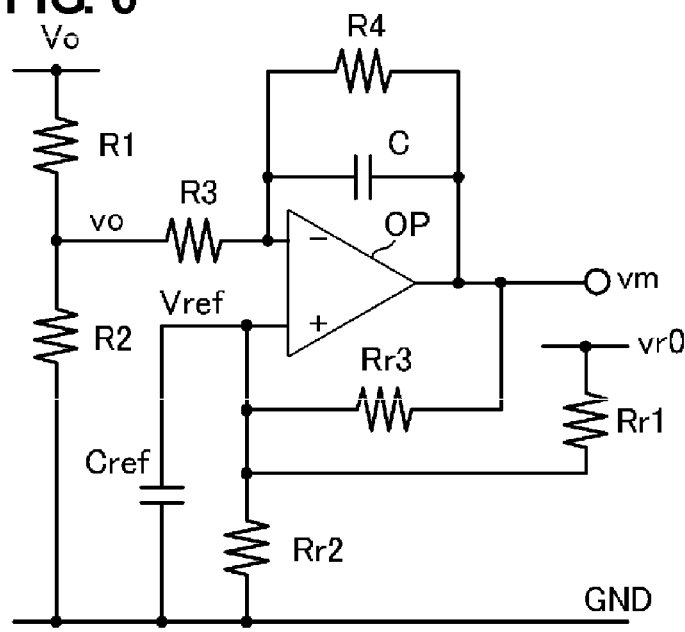
FIG. 6 is a circuit diagram of an output voltage error amplifier according to a second preferred embodiment of the present invention.

FIG. 6 is a circuit diagram of an output voltage error amplifier according to the second preferred embodiment. An input voltage Vref of a non-inverting input terminal (+) of an operational amplifier OP is represented by Formula (1) below. In Formula (1), Vm is the output voltage of the operational amplifier OP (the output of the output voltage error amplifier), vo is a detected output voltage value, and Vref is a desired output voltage value.

$$Vref=(vr0/Rr1+vm/Rr3)/(1/Rr1+1/Rr2+1/Rr3) \quad (1)$$

Note that since a capacitor Cref is connected in parallel with a resistor Rr2, the temporal variation in the desired output voltage value Vref decreases as the capacitance of the capacitor Cref increases. That is, the function of a low-pass filter is provided.

As described above with respect to various preferred embodiments of the present invention, when performing P control using a proportioning device as an error amplifier, a difference occurs between the desired output voltage value Vref and the output voltage vo in a steady state. Accordingly, the desired output voltage value Vref is changed in accordance with the difference. Since the vm and the difference are proportional to each other, correcting the vref using a value proportional to the vm effectively enables control of the output voltage to a given value. If an abrupt change in the Vref destabilizes the system, the low-pass filter characteristic is provided to change the Vref slowly.

As a result, it is possible to make the output voltage independent of the input voltage or load and constant while preventing deterioration of transient responsiveness.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power factor correction converter comprising:
   a rectifier circuit arranged to rectify an alternating-current voltage received from an alternating-current input power supply;
   a series circuit connected to a trailing portion of the rectifier circuit and an inductor and a switching element;
   a rectifying and smoothing circuit connected in parallel with the switching element;
   a switching control circuit arranged to on/off controls the switching element so that input current received from the alternating-current input power supply has a shape similar to a shape of the alternating-current voltage;

an input voltage detection circuit arranged to detect an input voltage received from the alternating-current input power supply;
an inductor current detection circuit arranged to detect current passing through the inductor; and
an output voltage detection circuit arranged to detect an output voltage of the rectifying and smoothing circuit; wherein
the switching control circuit defines, as a reference current amplitude value, a product of an output voltage error, the output voltage error being an error between a desired output voltage value and a value of the detected output voltage, and a value of the detected input voltage and controls the on-time of the switching element in accordance with a difference between the reference current amplitude value and current passing through the inductor; and
the switching control circuit includes an output voltage control value correction circuit arranged to correct one of the desired output voltage value and the output voltage error using a value proportional to the reference current amplitude value.

2. The power factor correction converter according to claim 1, wherein
the switching control circuit and the output voltage control value correction circuit include a digital signal processor arranged to maintain a digital value corresponding to the desired output voltage value; and
the output voltage control value correction circuit is arranged to correct the digital value using the value proportional to the reference current amplitude value.

\* \* \* \* \*